United States Patent [19]

Chapman et al.

[11] 4,332,086

[45] Jun. 1, 1982

[54] CATALYST BED LEVEL MEASURING DEVICE

[75] Inventors: Gary L. Chapman, Port Arthur; William H. Cummins, Nederland, both of Tex.

[73] Assignee: Texaco Inc., White Plains, N.Y.

[21] Appl. No.: 194,106

[22] Filed: Oct. 6, 1980

[51] Int. Cl.$^3$ .............................................. G01F 23/04
[52] U.S. Cl. .................................... 33/126.5; 141/94; 73/305
[58] Field of Search ........... 33/126, 126.4 R, 126.4 A, 33/126.5, 126.6; 141/94, 95, 387; 73/290 B, 305, 306, 322.5

[56] References Cited

U.S. PATENT DOCUMENTS

| 871,556 | 11/1907 | Bangs | 33/126.5 |
| 1,391,504 | 9/1921 | Renkin | 33/126.5 |
| 3,975,633 | 8/1976 | Larkin | 33/126.6 X |

Primary Examiner—Charles E. Phillips
Attorney, Agent, or Firm—Carl G. Ries; Robert A. Kulason; Henry C. Dearborn

[57] ABSTRACT

A device for measuring the level of a bed of finely divided solid such as a catalyst or the like. It can make the level measurement both near the center and near the periphery of the bed from a relatively small opening in the top of a container for the bed. It employs an angled tube with a line extending through the tube. The line has a weight attached to the free end of it. There is a spool mounted on a cross bar at one end of the tube for winding the line and so as to adjust the vertical position of the weight relative to the outer end of the tube.

6 Claims, 6 Drawing Figures

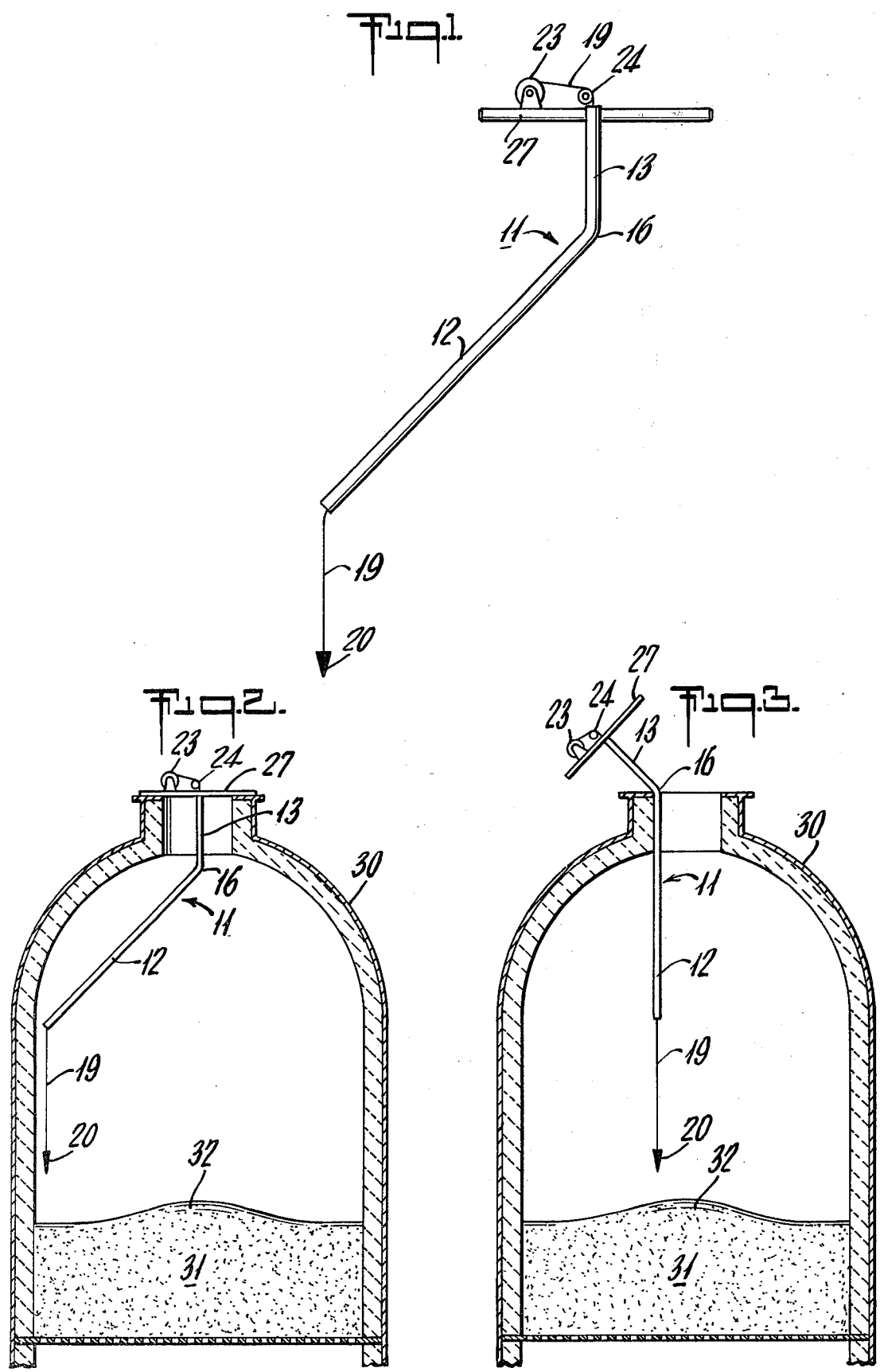

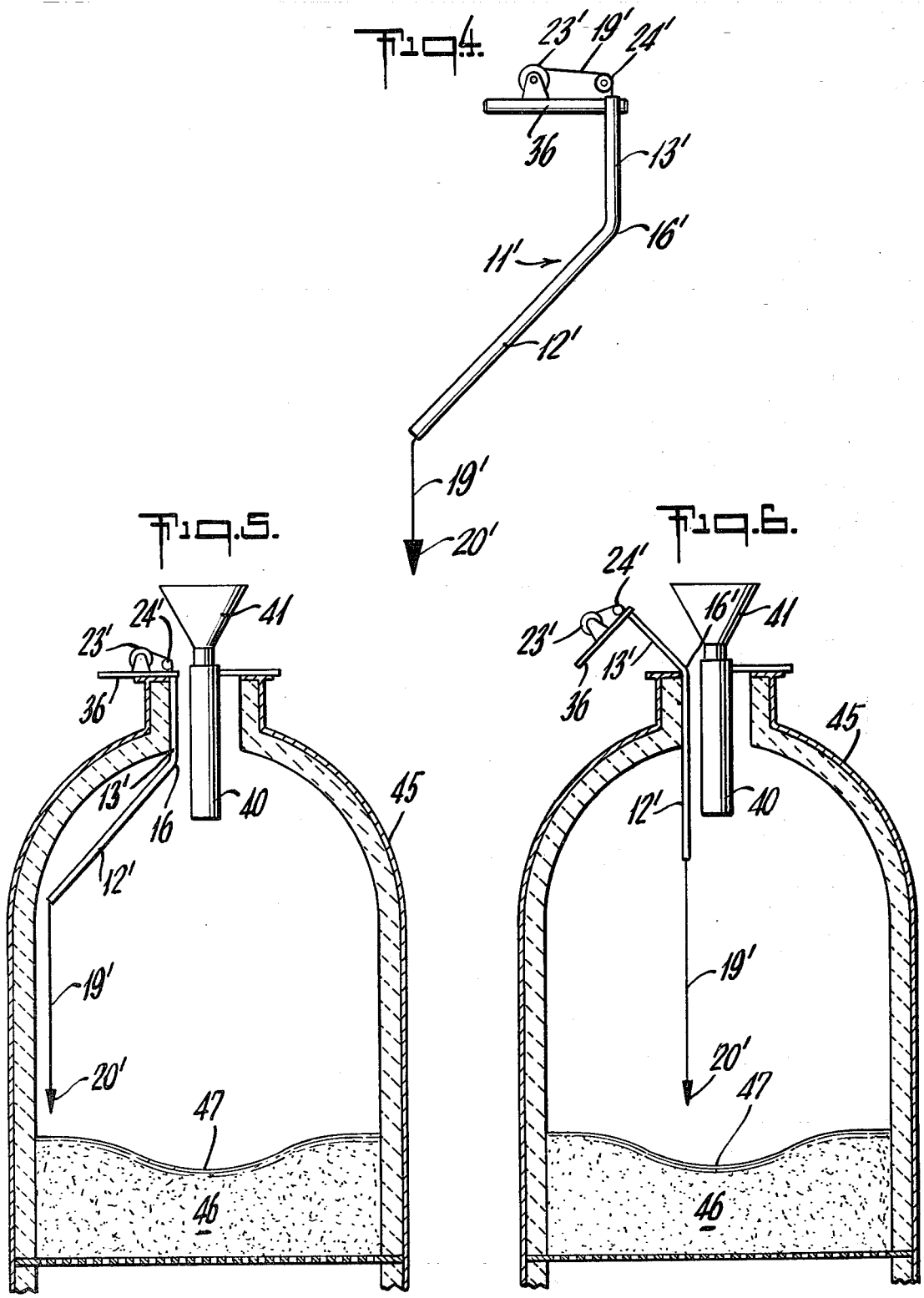

CATALYST BED LEVEL MEASURING DEVICE

BACKGROUND OF THE INVENTION

1. Field of the Invention

This invention concerns a device for measuring the level of solid materials in a vessel. More specifically, it deals with a device which may be used for measuring the level of a bed of finely divided solid material such as a catalyst, to determine whether the level of the bed is the same near the center as at the periphery of such bed.

2. Description of the Prior Art

There is a known level measuring device that is for use with a container of bulk material. Such device is shown and described in a U.S. Pat. No. 3,629,946 issued Dec. 28, 1971. However, that device is designed for measuring the level of material in a container such as a silo, while the operator stands on the ground outside.

On the other hand, it is an object of this invention to provide a simple yet highly effective device that is usable with the loading of catalyst beds in a vertical reactor or the like. The loading operation of such reactor beds tends to create considerable dust which obscures visual monitoring. Also, where the loading operation is carried out by the type of machine which may be adjusted to control distribution of the catalyst over the internal area, the adjustment may make the material tend to either mound up at the center or build up higher near the edges. Consequently it is desirable to be able to determine the adjustment as the material is being introduced into the reactor.

SUMMARY OF THE INVENTION

Briefly, the invention concerns a catalyst bed level measuring device for use in a reactor or the like. It comprises an angled tubular member adapted for insertion at the top of the reactor, and a line extending through said tubular member and having a free end. It also comprises a weight attached to said free end of said line, and means for winding said line to adjust the vertical position of said weight relative to said tubular member.

Again briefly, the invention concerns a catalyst bed level measuring device for use in a reactor or the like. It comprises an angled tubular member having two straight segments joined at one end of each, and a line extending through said tubular member and having a free end. It also comprises a weight attached to said free end of said line. A longer one of said segments has a predetermined length less than the height of said reactor top above the maximum level of said catalyst bed. It also comprises a cross bar attached at right angles at the free end of the other one of said segments. The said cross bar is long enough to extend across the top of said reactor. It also comprises a spool mounted on said cross bar for winding said line to adjust the vertical position of said weight relative to said longer segment. The said other segment has a length such that when said cross bar is horizontal the free end of said longer segment has a vertical displacement equal to the length of said longer segment.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 1 is a side elevation of a device according to a preferred embodiment of the invention;

FIG. 2 is a schematic longitudinal cross section of a reactor, showing a device according to FIG. 1 (in somewhat reduced scale) which is in use to measure the catalyst level near the edge of the catalyst bed in the reactor;

FIG. 3 is another schematic like FIG. 2, but with the device located for measuring the catalyst bed level near the center of the reactor;

FIG. 4 is a side elevation of a different modification of a measuring device according to the invention;

FIG. 5 is another schematic like FIG. 2, but with a catalyst loading device in place at the top, and also a device according to the FIG. 4 modification in use for measuring catalyst bed level near the edge of the bed; and FIG. 6 is another schematic like FIG. 5 but with the level measuring device according to the FIG. 4 modification, placed for measuring the bed level near the center.

DESCRIPTION OF THE PREFERRED EMBODIMENTS

There is widespread use in connection with reactors that employ finely divided solid catalysts, of so called dense loading devices which have been developed. These can act so as to introduce the catalyst onto a bed of same which is spread evenly over the entire bed. Such devices are like those described in U.S. Pat. Nos. 4,039,431 and 4,159,785. However, when adjusting such a loading device it must be determined that it is not either building a mound of catalyst at the middle or a higher level near the edges (or periphery) of a bed. Furthermore, it is important to monitor the loading even after initial adjustment so that the catalyst bed continues to be applied evenly. When a catalyst bed is uneven there will tend to be so called feed channeling through that portion of the bed where it is thinner.

Visual inspection of the application of a catalyst bed is often quite difficult, if not impossible, because there tends to be a significant amount of dusting. But, a device according to this invention can make measurements in a simple yet effective manner so as to determine the level near the center and also near the periphery of a bed of catalyst.

One embodiment of a device according to the invention is illustrated in FIG. 1. It will be observed that there is an angled tubular member 11 that has two straight segments 12 and 13 that are joined at a connection 16 that is at one end of each of the segments. There is a line 19 that extends through the tubular member 11 and has a weight 20 attached to the free end of the line 19. The other end of the line 19 is wound on a spool 23 after passing over a guide pulley 24. The spool 23 is mounted on a cross bar 27 that is attached at right angles to the free end of the segment 13.

FIGS. 2 and 3 illustrate the device as it may be used with a reactor 30 that has a bed 31 of finely divided solid catalyst therein. In these illustrations the bed 31 of catalyst has built up unevenly so that there is a mound 32 at the middle.

As indicated in FIG. 3, it will be noted that the longer segment 12 has a predetermined length that is less than the height of the mound 32 of catalyst, in order to allow room for the weight 20 to move down until it contacts the bed for making a determination of the level thereof. In addition, the shorter segment 13 is designed so as to have a predetermined length relative to the length of the longer segment 12, and taking into account the horizontal distance from the connection 16 to the free end of segment 12 when the cross bar 27 is horizontal, such that the free end of segment 12 will be at the same vertical level as when the segment 12 was vertical, i.e., as shown in FIGS. 2 and 3. Of course, the cross bar 27 is made long enough to extend all the way across the top of the reactor 30. And, it will be noted that a simple manipulation of the line 19 will permit a direct measurement of the level of the bed 31, this with the device in each of the two positions illustrated in FIGS. 2 and 3 respectively.

FIG. 4 illustrates another embodiment of the device which is substantially the same as that illustrated in FIG. 1 except for a cross bar 36. This cross bar 36 extends at right angles but only in the same direction as the longer segment 12' of the angled tubular member 11'. It will be noted that the elements which are unchanged in the FIG. 4 modification from those of the FIG. 1 embodiment, are given the same reference numerals but with prime marks added.

FIGS. 5 and 6 illustrate the manner in which a measuring device in accordance with the FIG. 4 modification may be employed simultaneously with the introduction of catalyst material by a dense loading device 40 that may include a hopper 41 as illustrated. In these illustrations there is indicated a reactor 45 with a bed 46 of catalyst therein. However, in this case a dished portion 47 is indicated at the center of the reactor. Such a dished portion 47 would be formed if the loading device 40 should be adjusted so as to throw too much of the catalyst out to the periphery of the reactor.

It will be understood that there are catalyst dense loading devices, as indicated above, which are available commercially.

It may be observed from FIGS. 2, 3, 5 and 6 that the action of the loader when not properly adjusted tends to build a mound of catalyst as indicated at reference numeral 32 in FIGS. 2 and 3, or the reverse which makes a dished portion 47 as indicated in FIGS. 5 and 6. By using the device according to this invention in the positions indicated by FIGS. 2 and 5, the level of the catalyst bed near the periphery thereof may be readily determined without being able to see in to make a visual determination. Similarly, by employing the device in the manner illustrated in FIGS. 3 and 6, the level of the catalyst bed may be measured near the middle.

It may be noted that the relative position of the free end of each of the angled segments 12 and 12' is at the same horizontal level relative to the reactor 30 or 45 whether the member 11 or 11' is in the position illustrated in FIGS. 2 and 5 or that illustrated in FIGS. 3 and 6. This is because of the above indicated relationship of the length of segment 13 or 13' to the length of the other segment 12 or 12' in each case. In other words, the length of the shorter segment 13 may be determined by solving the equation $c^2 - 2bc + d^2 = 0$, where c is the length of segment 13; b is the length of the segment 12; and d is the horizontal distance from the connection 16 to the free end of segment 12 when the member 11 is in the position illustrated in FIGS. 1 and 2.

While particular embodiments of the invention have been described above in considerable detail in accordance with the applicable statutes, this is not to be taken as in any way limiting the invention but merely as being descriptive thereof.

We claim:

1. Catalyst bed level measuring device for use in a reactor or the like, comprising
   an angled tubular member comprising a pair of segments joined at one end of each and adapted for insertion at the top of said reactor,
   a line extending through both said segments of said tubular member and having a free end,
   a weight attached to said free end of said line,
   means for winding said line to adjust the vertical position of said weight relative to said tubular member,
   said winding means being mounted adjacent to a free end of one of said segments,
   one of said segments having a predetermined length less than the height of said reactor top above the maximum level of said catalyst bed,
   the other of said segments having a shorter predetermined length,
   a transverse member adjacent to the free end of said shorter segment, and
   said shorter segment having a length such that when said transverse member is horizontal the free end of said one segment has a vertical displacement equal to the length of said one segment.

2. Catalyst bed level measuring device according to claim 1, wherein
   said transverse member comprises a cross bar, and
   said winding means comprises a spool.

3. Catalyst bed level measuring device according to claim 2, wherein
   said cross bar is long enough to extend across the top of said reactor.

4. Catalyst bed level measuring device according to claim 2, wherein
   said cross bar comprises a transverse member extending only in the same direction as said one segment.

5. Catalyst bed level measuring device according to claim 2, wherein
   said spool is mounted on said cross bar.

6. Catalyst bed level measuring device for use in a reactor or the like, comprising
   an angled tubular member having two straight segments joined at one end of each,
   a line extending through said tubular member and having a free end,
   a weight attached to said free end of said line,
   a longer one of said segments having a predetermined length less than the height of said reactor top above the maximum level of said catalyst bed,
   a cross bar attached at right angles at the free end of the other one of said segments,
   said cross bar being long enough to extend across the top of said reactor,
   a spool mounted on said cross bar for winding said line to adjust the vertical position of said weight relative to said longer segment,
   said other segment having a length such that when said cross bar is horizontal the free end of said longer segment has a vertical displacement equal to the length of said longer segment.

* * * * *